United States Patent
Griffin et al.

(10) Patent No.: US 12,154,006 B2
(45) Date of Patent: Nov. 26, 2024

(54) PREDICTING AND MINIMIZING QUANTUM DECOHERENCE IN QUANTUM COMPUTER SYSTEMS

(71) Applicant: RED HAT, INC., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 139 days.

(21) Appl. No.: 17/945,158

(22) Filed: Sep. 15, 2022

(65) Prior Publication Data

US 2024/0095574 A1   Mar. 21, 2024

(51) Int. Cl.
| | | |
|---|---|---|
| G06F 9/44 | (2018.01) | |
| G06F 8/30 | (2018.01) | |
| G06N 10/80 | (2022.01) | |

(52) U.S. Cl.
CPC .............. *G06N 10/80* (2022.01); *G06F 8/31* (2013.01)

(58) Field of Classification Search
CPC ...................................... G06N 10/80
USPC ........................................ 717/106
See application file for complete search history.

(56) References Cited

U.S. PATENT DOCUMENTS

| | | | |
|---|---|---|---|
| 7,277,872 B2 * | 10/2007 | Raussendorf .......... | G06N 10/00 706/14 |
| 9,858,531 B1 | 1/2018 | Monroe et al. | |
| 10,592,216 B1 * | 3/2020 | Richardson ......... | G06F 11/3452 |
| 11,295,226 B2 | 4/2022 | Griffin et al. | |
| 2018/0260245 A1 | 9/2018 | Smith | |
| 2019/0042973 A1 | 2/2019 | Zou et al. | |
| 2021/0334081 A1 | 10/2021 | Chong et al. | |
| 2023/0126764 A1 * | 4/2023 | Ibrahim ................. | G06N 20/10 705/44 |
| 2023/0162077 A1 * | 5/2023 | Hwang .................. | G06N 10/20 706/62 |

OTHER PUBLICATIONS

Zhang et al., "Optimizing Quantum Programs against Decoherence-Delaying Qubits into Quantum Superposition", https://arxiv.org/pdf/1904.09041.pdf, Jul. 27, 2019; pp. 1-8.
Schlosshauer, Maximilian, "The Quantum-to-Classical Transition And Decoherence", https://arxiv.org/pdf/1404.2635.pdf, Nov. 20, 2019; pp. 1-22.

* cited by examiner

*Primary Examiner* — Evral E Bodden
(74) *Attorney, Agent, or Firm* — Kilpatrick Townsend & Stockton LLP

(57) ABSTRACT

In one example described herein a system can receive, by a gate analysis service, a quantum assembly language (QASM) file. The QASM file can define a quantum algorithm that can include logic gates that can be executed on a quantum computer system. The system can access, by the gate analysis service, a data repository that can include an estimated amount of quantum decoherence associated with each logic gate of a plurality of logic gates that includes the logic gates. The system can determine, by the gate analysis service, a prediction of an amount of quantum decoherence associated with executing at least one logic gate of the logic gates on the quantum computer system. Additionally, the system can adjust, by the gate analysis service, the QASM file to modify the prediction associated with executing the logic gates on the quantum computer system.

20 Claims, 3 Drawing Sheets

PREDICTING AND MINIMIZING QUANTUM DECOHERENCE IN QUANTUM COMPUTER SYSTEMS

TECHNICAL FIELD

The present disclosure relates generally to quantum computer systems. More specifically, but not by way of limitation, this disclosure relates to predicting and minimizing quantum decoherence in quantum computer systems.

BACKGROUND

Quantum computers perform computations utilizing quantum mechanical phenomena, such as superposition, interference, and entanglement. Unlike classical computers that process data encoded in binary bits, each of which is in one of two definite states ("0" or "1"), quantum computers process data in units of quantum bits (qubits) that can be in a superposition of states. "Superposition" refers to the ability of each qubit to represent both a "0" and "1" at the same time. The qubits in a superposition can be correlated with each other (referred to as "entanglement"). That is, the state of a given qubit (whether it is a "0" or "1") can depend on the state of another qubit. A quantum computer with N qubits can be in a superposition of up to 2N states simultaneously. Compared to the classical computers that can only be in one of these 2N states at a particular time, quantum computers may solve difficult problems that are infeasible using classical computers.

Qubits stop being in superposition and return to classical values of "0" or "1" after intentional observation or unintentional error, such as a radiation leak. The value of a single qubit after observation is completely random. Quantum computers may use superposition and quantum algorithms to create a deterministic sequence of qubit states before intentional observation occurs. During the deterministic sequence of qubit states, a phase relationship between qubit states can be affected. For example, quantum decoherence can occur when there is a loss of ordering of phase angles between components of the qubits in superposition. As a result of quantum decoherence, the qubits can return to behaving as binary bits which can alter an expected outcome during intentional observation.

DETAILED DESCRIPTION

Figure 1:
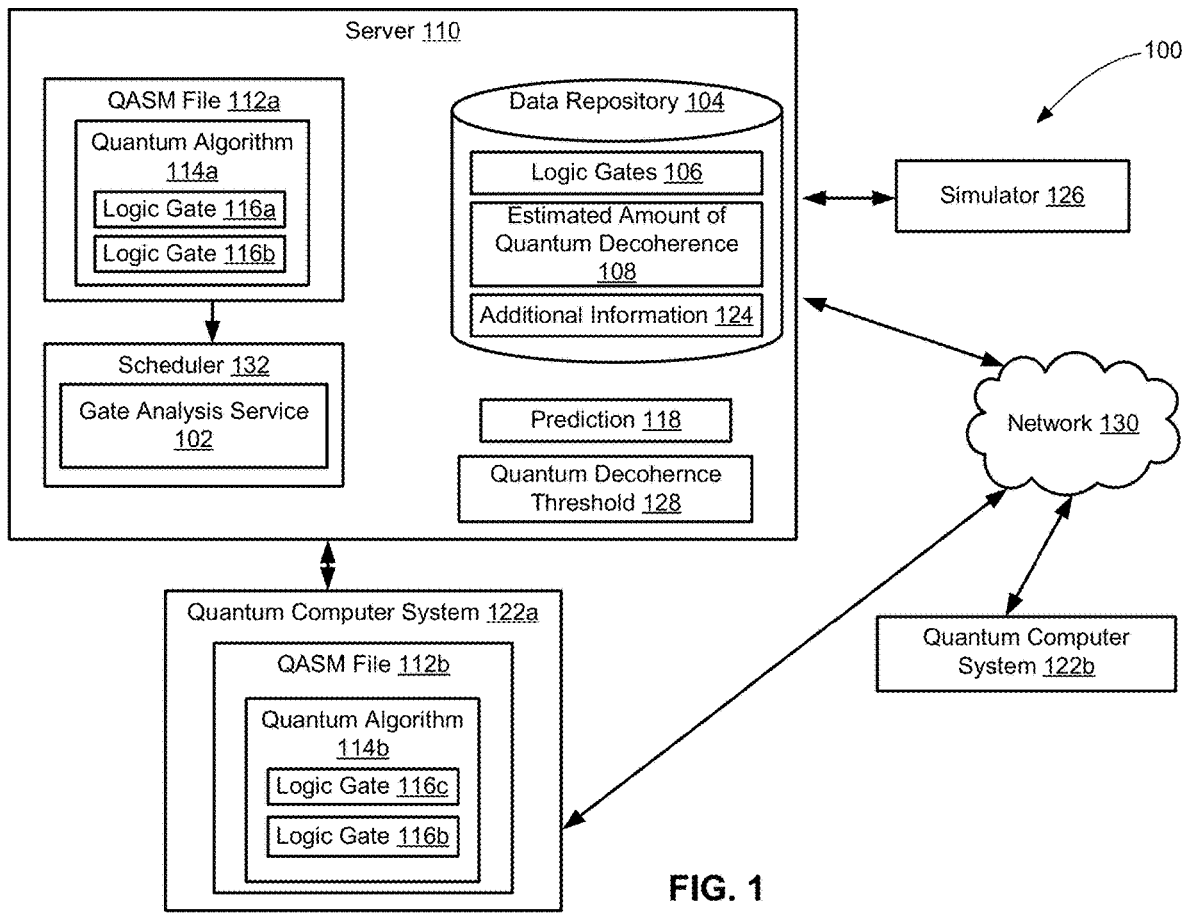
FIG. 1 is a block diagram of an example of a system for predicting and minimizing quantum decoherence in quantum computer systems according to one example of the present disclosure.

Quantum computing can be in the noisy intermediate-scale quantum (NISQ) era, which can limit the size of quantum circuits that can be executed reliably. Additionally, quantum computer systems can be sensitive to noise, execution time, heat, errors, and the like. Due to the NISQ era of quantum computing and the sensitivity of quantum computer systems, quantum algorithms can often fail because of quantum decoherence. As an example, a quantum assembly language (QASM) file containing a quantum algorithm defining a series of logic gates can be executed on a quantum computer system. The execution of each logic gate can have a computational impact on the quantum computer system in the form of errors, heat, noise, etc., which can increase the risk of quantum decoherence for the quantum computer system. With quantum bits returning to binary bits, the quantum computer system can lose the ability to perform quantum computations, and thus the quantum computer system can be suboptimal.

Some examples of the present disclosure can overcome one or more of the abovementioned problems by providing a system that can analyze the QASM file and adjust the logic gates of the quantum algorithm defined in the QASM file to minimize quantum decoherence prior to execution on the quantum computer system. Analyzing the QASM file can be based on historical runs of QASM files on the quantum computer system or simulated runs of the QASM files in a virtual environment representing the quantum computer system. The analysis can provide insight regarding errors or a buildup of errors from the execution of the logic gates, which can cause quantum decoherence in the quantum computer system. In addition, the analysis of the QASM file can be used to determine improvements or adjustments to the quantum algorithm. For example, the logic gates can be reordered, replaced, or otherwise altered by the system to decrease the risk of quantum decoherence associated with executing the QASM file on the quantum computer system. Additionally, the buildup of errors or other computational impacts, such as heat, noise, etc., from executing the logic gates may result in a predicted increase in the risk of quantum decoherence for the quantum computer system. The analysis of the QASM file, including the prediction of the increased risk of quantum decoherence, can be stored to develop a data repository for advancing improvements to future quantum algorithms and minimizing the risk of decoherence for quantum computer systems.

As an example, a gate-based approach can be implemented, in which a gate analysis service of a computer system can analyze the logic gates in an order defined by the quantum algorithm. The logic gates can be a physical manipulation of qubits that can prepare qubits for superposition or entanglement. The physical manipulation of the qubits can complement goals of the quantum algorithm. For example, the goal of the quantum algorithm can be to solve a classical computing problem faster. Additionally, the physical manipulation of qubits can cause the computational impact on the quantum computer system. For example, the computational impact can be an increase in heat for the quantum computer system, which can increase the risk of quantum decoherence. During the analysis, the gate analysis service can access a data repository that stores information about logic gates. For example, the gate analysis service can determine, via the data repository, that a first logic gate in the QASM file previously caused a three percent increase in heat for the quantum computer system when executed in another QASM file. The three percent increase in heat can additionally correspond to a ten percent increase in risk of quantum decoherence for the quantum computer system. Thus, the gate analysis service can predict that the first logic gate will cause the ten percent increase in the risk of quantum decoherence. However, the gate analysis service can further determine, based on data in the data repository, that a second logic gate that provides the same action as the first logic in the quantum algorithm is associated with a five percent increase in the risk of quantum decoherence. The gate analysis service can, as an example, provide the second logic gate to a developer of the quantum algorithm via an integrated development environment (IDE), or the gate analysis service can automatically replace the logic gate with the second logic gate. As a result, the risk of decoherence associated with executing the quantum algorithm is reduced for the quantum computer system.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a system 100 for predicting and minimizing quantum decoherence in quantum computer systems according to one example of the present disclosure. The system 100 can include a server 110 and one or more quantum computer systems, such as quantum computer systems 122a-b. The server 110 can include a scheduler 132 and a gate analysis service 102 that is integrated with or communicatively coupled to the scheduler 132. Each of the scheduler 132 and the gate analysis service 102 can communicate with a data repository 104 to mitigate quantum decoherence. The server 110 and the quantum computer systems 122a-b can communicate via a network 130, such as a local area network (LAN) or the Internet.

In an example, the gate analysis service 102 can receive a QASM file 112a. The QASM file 112a can define a quantum algorithm 114a, which can include a set of logic gates, such as logic gates 116a-b. In some examples, the QASM file 112a can define how the quantum algorithm 114a interfaces with a set of qubits, how the quantum algorithm 114a interfaces with the logic gates 116a-b, or a combination thereof. Additionally, the QASM file 112a may contain comments from a developer or other suitable information. The logic gates 116a-b can be executed on a set of qubits in the quantum computer system 122a to place the set of qubits into superposition and guide the quantum algorithm 114a toward an outcome.

In some examples, the scheduler 132 can be part of or communicatively coupled to the server 110, the quantum computer systems 122a-b, the gate analysis service 102, or a combination thereof. The QASM file 112a may contain additional information identified by the scheduler 132. For example, the additional information can include historical information about utilizing qubits in the quantum computer system 122a. For example, the historical information can include quantum algorithms, logic gates, or QASM files previously executed on the quantum computer system 122a. The additional information can further include a number of qubits, types of qubits, or locational information about the set of qubits within the quantum computer system 122a. The additional information can be used by the gate analysis service 102 to determine a current amount of quantum decoherence of the quantum computer system 122a. The current amount of quantum decoherence can be a probability of the quantum computer system 122a experiencing quantum decoherence. As a particular example, the current amount of quantum decoherence may be 20%, indicating that there is a 20% likelihood that the quantum computer system 122a is experiencing quantum decoherence. The current amount of quantum decoherence may alternatively be a percentage of the quantum computer system 122a experiencing quantum decoherence. So, a value of 20% for the quantum decoherence can indicate that 20% of the qubits of the quantum computer system 122a are experiencing quantum decoherence.

In some examples, the logic gates 106 can include the logic gates 116a-c. Thus, the gate analysis service 102 can determine a prediction 118 of an amount of quantum decoherence associated with executing the logic gates 116a-b on the quantum computer system 122a or the quantum computer system 122b based on the estimated amount of quantum decoherence 108 for the logic gates 116a-b. The prediction 118 of the amount of quantum decoherence can be the predicted likelihood of the quantum computer system 122a experiencing quantum decoherence as a result of executing the logic gates 116a-b. The prediction 118 of the amount of quantum decoherence can be generated by the gate analysis service 102. The estimated amount of quantum decoherence 108 can be an estimated probability of the quantum computer system 122a experiencing quantum decoherence as a result of executing the logic gates 116a-b. The estimated amount of quantum decoherence can be provided to the gate analysis service 102 by the data repository 104.

In some examples, a second current amount of quantum decoherence can be determined for quantum computing system 122b. The first amount of quantum decoherence and the second current amount of quantum decoherence of quantum computer systems 122a-b may be used by the gate analysis service 102 to determine whether to execute the QASM file 112a on quantum computer systems 122a-b. The gate analysis service 102 may further determine on which quantum computer system of quantum computer systems 122a-b to execute the QASM file 112a. The QASM file 112a may be executed on the quantum computer system of quantum computer systems 122a-b with a lower current amount of quantum decoherence.

The gate analysis service 102 can further access the data repository 104, which store associations between multiple logic gates and estimated amounts of quantum decoherence 108 for each logic gate. In some examples, the data repository 104 can store or access additional information 124, such as error, noise, and heat information relating to the quantum computer systems 122a-b. The additional information 124 can be determined by the gate analysis service 102, a simulator 126, the scheduler 132, or measured directly from the quantum computer systems 122a-b. The information 124 can cause or can be directly related to the prediction 118 of the amount of quantum decoherence associated with executing one or more logic gates on the quantum computer systems 122a-b. The prediction 118 can be a likelihood that the quantum computer systems 122a-b will experience quantum decoherence as a result of executing the logic gates 116a-c.

In some examples, the data repository 104 can associate each of the quantum computer systems 122a-b, parameters of quantum algorithm 114a or error information related to previous executions of the quantum algorithm 114a with the estimated amount of quantum decoherence 108. The parameters may include a number of qubits involved in executing the quantum algorithm 114a or predicted temperatures of the quantum computer systems 122a-b during the execution of the quantum algorithms 114a, which can affect the estimated amount of quantum decoherence 108. The data repository 104 can further include indications of machine types of the quantum computer systems 122a-b, a number of qubits of the quantum computer systems 122a-b, and hardware of the quantum computer systems 122*a-b*, etc., which can also affect the estimated amount of quantum decoherence 108.

Quantum decoherence can accumulate during execution of the quantum algorithm 114*a*, therefore the gate analysis service 102 may predict the amount of quantum decoherence associated with at least one of the logic gates 116*a-b* or associated with the quantum algorithm 114*a* as a whole. Additionally, the gate analysis service 102 may predict at which logic gate 116*a-b* in the quantum algorithm 114*a* the prediction 118 meets or exceeds a quantum decoherence threshold 128. The gate analysis service 102 may also predict at which logic gate in the quantum algorithm 114*a* the quantum algorithm 114*a* will fail. Failure of the quantum algorithm 114*a* can be associated with quantum decoherence. For example, the quantum algorithm 114*a* may fail because the buildup of errors from execution of the logic gates 116*a-b* causes quantum decoherence in the quantum computer system 122*a*. The quantum decoherence can cause the set of qubits to behave as binary bits, and therefore the set of qubits can no longer be put into superposition and the phase relationship of the set of qubits can be lost.

In some examples, additional logic gates can be included in the quantum algorithm 114*a*, in addition to logic gates 116*a-b*, that may not be included in the plurality of logic gates 106. Therefore, it may be necessary to determine additional estimated amounts of quantum decoherence for the additional logic gates. The additional estimated amounts of quantum decoherence can be determined by a simulator 126 that can simulate the execution of the additional logic gates on quantum computer systems 122*a-b*. Simulating the additional logic gates can provide the additional estimated amounts of quantum decoherence without damaging or otherwise affecting the quantum computer systems 122*a-b*. In other examples, the additional estimated amounts decoherence can be determined by execution of the additional logic gates on quantum computer systems 122*a-b*. The additional estimated amounts of quantum decoherence can be stored in the data repository 104 for future use.

In some examples, the gate analysis service 102 can adjust the QASM file 112*a* based on the prediction 118 of the amount of quantum decoherence associated with executing logic gates 116*a-b*. The amount of quantum decoherence can be the likelihood of the quantum computing system 122*a* experiencing quantum decoherence, an increase in the likelihood of the quantum computer system 122*a* experiencing quantum decoherence, or another suitable measure of quantum decoherence for the quantum computer system 122*a*. Adjusting the QASM file 112*a* can decrease the prediction 118 of the amount of quantum decoherence associated with executing the QASM file 112*a* on the quantum computer system 122*a*. The decrease in the prediction 118 can indicate a decrease in the risk of quantum decoherence or a decrease in the errors, heat, etc. experienced by the quantum computer system 122*a* during execution of the QASM file 112*a*. The decrease in the prediction 118 can further decrease damage to the quantum computer system 122*a* that may result from executing the QASM file 112*a* and can increase the lifespan of the quantum computer system 122*a*.

In some examples, the QASM file 112*a* can be adjusted by replacing one or more of logic gates 116*a-b* with another logic gate, such as logic gate 116*c*. For example, logic gate 116*a* may retrieve a set of qubits. The data repository 104 can include an estimated amount of quantum decoherence 108 for the logic gate 116*a* that can be based on the amount of quantum decoherence experienced when another quantum algorithm containing logic gate 116*a* was executed on quantum computer system 122*a*. The data repository 104 can further include an estimated amount of quantum decoherence 108 for logic gate 116*c*, in which logic gate 116*c* can also retrieve the set of qubits. The estimated amount of quantum decoherence 108 for logic gate 116*c* can be lower than the estimated amount of quantum decoherence 108 for logic gate 116*a*. Therefore, the QASM file 112*a* can be adjusted to replace logic gate 116*a* with logic gate 116*c* as illustrated in QASM file 112*b* that includes quantum algorithm 114*b*. Replacing logic gate 116*a* with logic gate 116*c* can decrease the prediction 118 for quantum algorithm 114*b* in comparison with the prediction 118 for quantum algorithm 114*a*.

Additionally or alternatively, the QASM file 112*a* can be adjusted by reordering the logic gates 116*a-c*. For example, a quantum algorithm 114*a* may include logic gates 116*a-c* in a first order of logic gate 116*a*, logic gate 116*b*, and then logic gate 116*c*. The logic gate 116*a* can retrieve the set of qubits, logic gate 116*b* can prepare the set of qubits, and logic gate 116*c* can address the set of qubits. The gate analysis service 102 can determine predictions 118 of the amount of quantum decoherence for logic gates 116*a-c*. The predictions 118 for logic gate 116*b* and logic gate 116*c* can be greater than a prediction 118 for logic gate 116*a* based on the estimated amounts of quantum decoherence 108 provided by the data repository 104. So, the gate analysis service 102 can adjust the QASM file 112*a* to a second order of logic gate 116*b*, then logic gate 116*a*, and then logic gate 116*c*. The second order can decrease the prediction 118 of the amount of quantum decoherence associated with executing the quantum algorithm as logic gate 116*a* can provide a short period of cooling or otherwise lowering the risk of quantum decoherence between logic gates 116*b-c*. Additionally, as the heat, errors, etc. from executing logic gates 116*a-c* can accumulate, the resulting risk of decoherence can also accumulate. Thus, to mitigate the risk of quantum decoherence, quantum algorithms 114*a-b* can be strategically ordered to execute logic gates 116*a-c* associated with higher predictions further apart. Therefore, the second order can provide a quantum algorithm that can perform the same actions of logic gates 116*a-c* with less impact on the quantum computer system 122*a* to decrease the risk of quantum decoherence.

In some examples, the gate analysis service 102 can automatically adjust the QASM file 112*a* or the gate analysis service 102 can provide suggestions to a developer for adjusting the QASM file 112*a*. For example, the gate analysis service 102 may automatically replace a first logic gate for a second logic gate with a prediction 118 that less than the first logic gate. The second logic gate and the first logic gate may perform the same action in the quantum computer system 122*a*. In another example, the gate analysis service 102 can provide an integrated development environment (IDE) in which the developer can create and edit the quantum algorithm 114*a*. The IDE can provide the predictions 118, the estimated amounts of quantum decoherence 108, etc. to the developer or other suitable entity. The IDE can further suggest or automatically implement adjustments to the quantum algorithm 114*a* to decrease the prediction 118 of the amount of quantum decoherence associated with executing the quantum algorithm 114*a*.

Additionally or alternatively, the gate analysis service 102 can send the QASM file 112*a* to the quantum computer system 122*a* for execution on the quantum computer system 122*a*. For example, the gate analysis service 102 can determine the quantum decoherence threshold 128 that can be an acceptable amount of quantum decoherence associated with executing the QASM file 112*a* on the quantum computer system 122a. In some examples, the acceptable amount of quantum decoherence can depend on the current amount of quantum decoherence of the quantum computer system 122a. The quantum decoherence threshold 128 can be an acceptable amount of quantum decoherence for the quantum algorithm 114a, for at least one of logic gates 116a-c, or for combinations of logic gates 116a-c. In an example, the gate analysis service 102 can adjust the QASM file 112a until the prediction 118 is less than the quantum decoherence threshold 128, and then the gate analysis service 102 can send the QASM file 112a to the quantum computer system 122a.

In some examples, the gate analysis service 102 can work in conjunction with the scheduler 132 or other suitable components to determine when to send the QASM file 112a or to which quantum computer system of quantum computer systems 122a-b to send the QASM file 112a. For example, the quantum computer systems 122a-b can be monitored in real-time through application programming interfaces (APIs) that can obtain key values such as CNOT, readout errors, T1 and T2 times, and other suitable key values. The CNOT value can be related to entangling or disentangling the set of qubits. The readout errors can be the errors in measuring the set of qubits. The T1 and T2 times can be constants for the quantum computer systems 122a-b, where T1 can be a thermal relaxation time and T2 can be a dephasing time. The key values can be used to determine a current state of the quantum computer systems 122a-b including the current amount of decoherence associated with the quantum computer systems 122a-b. Therefore, the key values can further be used to determine if the prediction 118 of the amount of quantum decoherence 120 associated with the QASM file 112a is acceptable for the quantum computer systems 122a-b or determine which quantum computer system of quantum computer systems 122a-b can execute the QASM file 112a without experiencing quantum decoherence.

Although FIG. 1 depicts a certain number and arrangement of components, other examples may include more components, fewer components, different components, or a different number of the components that is shown in FIG. 1. For instance, the system 100 can include more or less quantum computer systems than are shown in FIG. 1. Additionally, while three logic gates are shown in FIG. 1, in other examples the quantum algorithms 114a-b may include a different number of logic gates.

Figure 2:
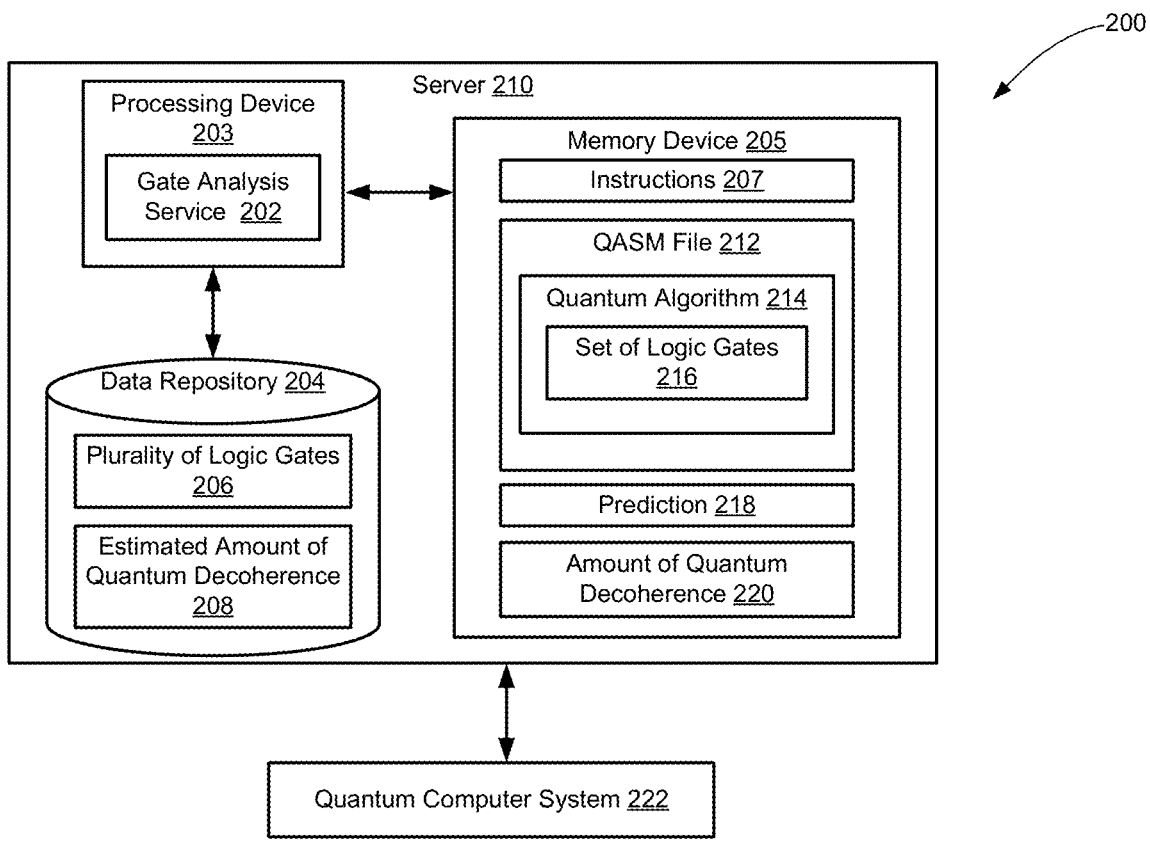
FIG. 2 is a block diagram of another example of a system for predicting and minimizing quantum decoherence in quantum computer systems according to one example of the present disclosure.

FIG. 2 is a block diagram of another example of a system 200 predicting and minimizing quantum decoherence in quantum computer systems according to one example of the present disclosure. The system 200 includes a processing device 203 that is communicatively coupled to a memory device 205. In some examples, the processing device 203 and the memory device 205 can be part of the same computing device, such as the server 210. In other examples, the processing device 203 and the memory device 205 can be distributed from (e.g., remote to) one another.

The processing device 203 can include one processor or multiple processors. Non-limiting examples of the processing device 203 include a Field-Programmable Gate Array (FPGA), an application-specific integrated circuit (ASIC), or a microprocessor. The processing device 203 can execute instructions 207 stored in the memory device 205 to perform operations. The instructions 207 may include processor-specific instructions generated by a compiler or an interpreter from code written in any suitable computer-programming language, such as C, C++, C #, Java, or Python.

The memory device 205 can include one memory or multiple memories. The memory device 205 can be volatile or non-volatile. Non-volatile memory includes any type of memory that retains stored information when powered off. Examples of the memory device 205 include electrically erasable and programmable read-only memory (EEPROM) or flash memory. At least some of the memory device 205 can include a non-transitory computer-readable medium from which the processing device 203 can read instructions 207. A non-transitory computer-readable medium can include electronic, optical, magnetic, or other storage devices capable of providing the processing device 203 with computer-readable instructions or other program code. Examples of a non-transitory computer-readable medium can include a magnetic disk, a memory chip, ROM, random-access memory (RAM), an ASIC, a configured processor, and optical storage.

The processing device 203 can execute the instructions 207 to perform operations. For example, the processing device 203 of the server 210 can execute a gate analysis service 202, which can receive a QASM file 212. The QASM file 212 can define a quantum algorithm 214 that can include a set of logic gates 216. The set of logic gates 216 can be executed on a quantum computer system 222. The processing device 203 can access, by executing the gate analysis service 202, a data repository 204 that can include an estimated amount of quantum decoherence 208 associated with each logic gate of a plurality of logic gates 206. The plurality of logic gates 206 can include the set of logic gates 216. The processing device 203 can determine, by executing the gate analysis service 202, a prediction 218 of an amount of quantum decoherence 220 associated with executing at least one logic gate of the set of logic gates 216 on the quantum computer system 222. The prediction 218 can be based on the estimated amount of quantum decoherence 208 associated with each logic gate of the plurality of logic gates 206. The processing device 203 can adjust, by executing the gate analysis service 202, the QASM file 212 to modify the prediction 218 associated with executing the set of logic gates 216 on the quantum computer system 222. By modifying the prediction 218, the risk of the quantum computer system 222 experiencing quantum decoherence can be reduced. Additionally, adjusting the QASM file 212 can minimize damage to the quantum computer system 222 associated with executing the QASM file 212 and can increase the lifespan of the quantum computer system 222.

Figure 3:
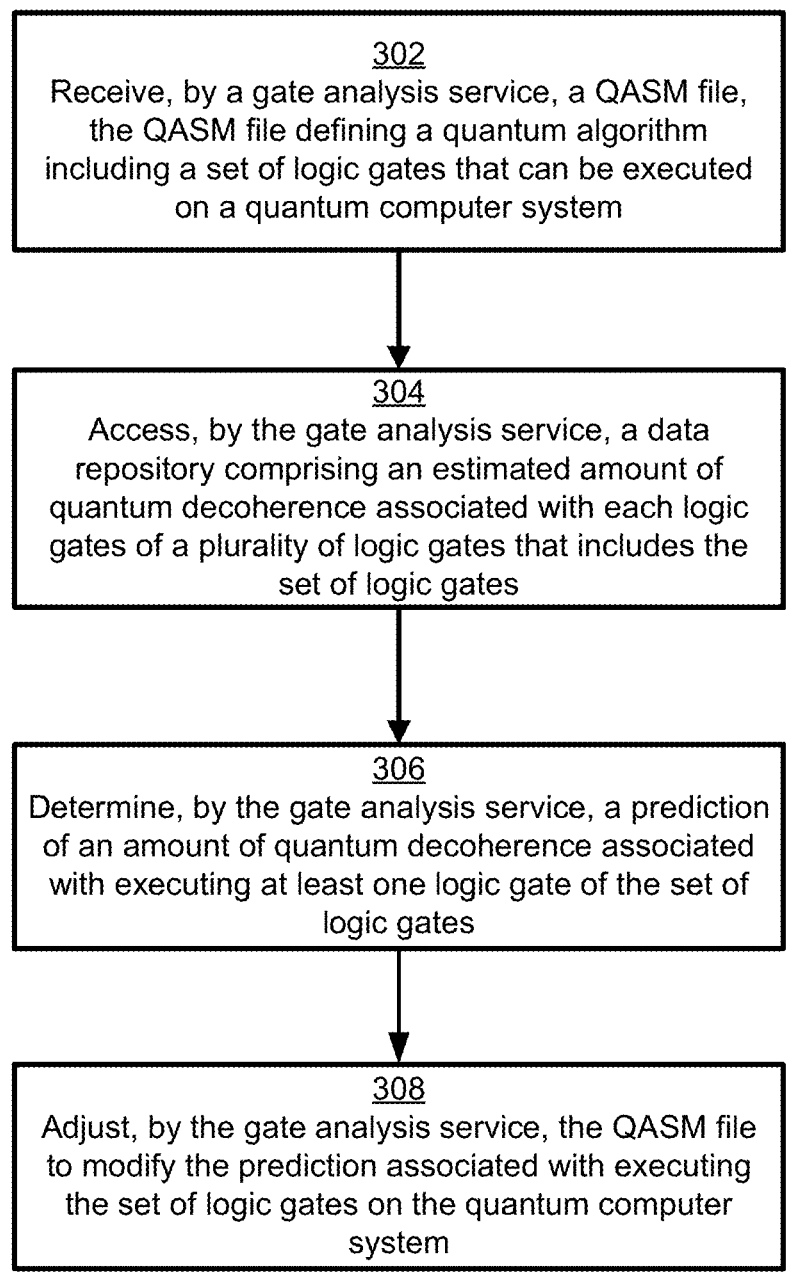
FIG. 3 is a flowchart of a process for predicting and minimizing quantum decoherence in quantum computer systems according to one example of the present disclosure.

FIG. 3 is a flowchart of a process for predicting and minimizing quantum decoherence in quantum computer systems according to one example of the present disclosure. In some examples, the processing device 203 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, the processing device 203 can receive, by a gate analysis service 202, a QASM file 212 that defines a quantum algorithm 214. The quantum algorithm 214 can include a set of logic gates 216 that can be executed on a quantum computer system 222. The set of logic gates 216 can be a set of physical manipulations performed on the qubits to put the qubits into a logical sequence of superpositions. Each logic gate of the set of logic gates 216 can generate friction in the quantum computer system 222. For example, friction can be errors, noise, heat, a mechanical change to the quantum computer system 222, etc.

In block 304, the processing device 203 can access, by the gate analysis service 202, a data repository 204 including an estimated amount of quantum decoherence 208 associated with each logic gate of a plurality of logic gates 206 that includes the set of logic gates 216. The estimated amount of quantum decoherence 208 can be determined by the gate analysis service 202 performing a simulation of executing the quantum algorithm 214 or executing at least one logic gate of the set of logic gates 216 on the quantum computer system 222. The data repository can be updated with additional information, new estimated amounts of quantum decoherence, etc.

In block 306, the processing device 203 can determine, by the gate analysis service 202, a prediction 218 of the amount of quantum decoherence 220 associated with executing at least one logic gate of the set of logic gates 216. The amount of quantum decoherence 220 can be based on the estimated amount of quantum decoherence 208 associated with each logic gate of the plurality of logic gates 206. The amount of quantum decoherence 220 can be a probability or likelihood of the quantum computer system 222 experiencing quantum decoherence. In some examples, quantum decoherence cannot be reversed and can permanently damage the quantum computing system 222. The amount of quantum decoherence 220 can accumulate. Therefore, the quantum algorithm 214 can be analyzed gate-by-gate to determine the prediction 218 for a logic gate, a combination of logic gates or for the set of logic gates 216.

In an example, the set of logic gates 216 is a first set of logic gates and a simulation can be performed by the gate analysis service 202 on a second set of logic gates included in the QASM file 212. The plurality of logic gates 206 may not include the second set of logic gates. Thus, performing the simulation provides the estimated amount of quantum decoherence 208 for at least one logic gate of the second set of logic gates. The estimated amount of quantum decoherence 208 of the at least one logic gate of the second set of logic gates can be stored in the data repository 204 and can be included in the plurality of logic gates 206 to improve the scope of the data repository 204.

Alternatively, the gate analysis service 202 can receive the amount of quantum decoherence 220 from an execution of the at least one logic gate of the second set of gates on the quantum computer system 222. Or, a scheduler, the quantum computer system 222, a database, or other resources can provide the gate analysis service 202 with information or data relating to the amount of quantum decoherence 220 associated with executing the first set of logic gates or the second set of gates. The information or data can also be stored in the data repository 204. Additionally, a second prediction can be determined based on the estimated amount of quantum decoherence 208 associated with executing the second set of logic gates on the quantum computer system 222.

Additionally, in some examples, the quantum computer system 222 can be a first quantum computer system and the prediction 218 can be a first prediction of a first amount of quantum decoherence. The gate analysis service 202 can determine a second prediction of a second amount of quantum decoherence for executing the QASM file 212 on a second quantum computer system. The second prediction can be based on the data repository 204 or a simulation of the execution of the set of logic gates 216 on the second quantum computer system. The gate analysis service 202 can compare the second prediction and the first prediction to determine which is lower. The gate analysis service 202 can then execute the QASM file 212 on the quantum computer system of the first and the second quantum computer systems for which executing the QASM file 212 is associated with a lower prediction 218.

Additionally or alternatively, the gate analysis service 202 may determine a quantum decoherence threshold for at least one logic gate of the set of logic gates 216. The gate analysis service 202 can further determine whether the prediction 218 of the amount of quantum decoherence 220 associated with the at least one logic gate of the set of logic gates 216 exceeds the quantum decoherence threshold. The quantum decoherence threshold can be an acceptable amount of quantum decoherence for the quantum computer system 222, such that executing a QASM file 212 with a prediction 218 below the quantum decoherence threshold may not damage the quantum computer system 222. In some examples, the quantum decoherence threshold can represent failure of the quantum algorithm 214, such that a prediction 218 that exceeds the quantum decoherence threshold can indicate a likely failure of the quantum algorithm 214. Additionally, the logic gate of the set of logic gates 216 that causes the prediction 218 to exceed the quantum decoherence threshold can indicate when the failure of the quantum algorithm 214 is likely to occur.

In block 308, the processing device 203 can adjust, by the gate analysis service 202, the QASM file 212 to modify the prediction 218 associated with executing the set of logic gates 216 on the quantum computer system 222. In some examples, the prediction 218 can be reduced by adjusting the QASM file 212. The gate analysis service 202 can automatically adjust the QASM file 212 or the gate analysis service 202 may provide adjustments to a developer for the developer to adjust the QASM file 212 via the gate analysis service 202. For example, the gate analysis service 202 can provide the developer an IDE for creating, editing, or adjusting the quantum algorithm 214. The IDE may include the predictions 218 or additional information provided by the gate analysis service 202.

In some examples, adjusting the QASM file 212 can include the gate analysis service 202 altering the at least one logic gate by replacing the at least one logic gate of the set of logic gates 216 for which the prediction 218 exceeds a second quantum decoherence threshold. The at least one logic gate can be replaced with at least one logic gate of the plurality of logic gates 206 with an estimated amount of quantum decoherence 208 that does not exceed the second quantum decoherence threshold. Additionally, the set of logic gates 216 can be defined in a first order associated with the prediction 218 of the amount of quantum decoherence 220. Adjusting the QASM file 212 can include reordering at least one logic gate of the set of logic gates 216 and at least one additional logic gate of the set of logic gates 216 into a second order based on the prediction 218 of the amount of quantum decoherence 220 and a second prediction of the amount of quantum decoherence 220 for the at least one additional logic gate. The second prediction can be associated with a smaller amount of decoherence. In some examples, the second prediction can be determined based on a simulation of the second order.

Additionally or alternatively, the processing device 203 can, subsequent to adjusting the QASM file 212, send the QASM file 212 to the quantum computer system 222 for execution of the quantum computer system 222. In some examples, the gate analysis service 202 can send the QASM file 212 based on a quantum decoherence threshold. For example, if the prediction 218 is less than the quantum decoherence threshold, the gate analysis service 202 may automatically send the QASM file 212 to the quantum computer system 222.

In some examples, the gate analysis service 202 can be part of, communicatively coupled to, or otherwise paired with a scheduler. The gate analysis service 202 can send the QASM file 212 to the quantum computer system 222 based on the prediction 218 and further based on information received from the scheduler. For example, the scheduler can provide insight into QASM files that were recently run on the quantum computer system 222, QASM files scheduled to be run on the quantum computer system 222, or other suitable information. Additionally, the quantum computer system 222 can be monitored in real-time to determine a current amount of quantum decoherence for the quantum computer system 222. Thus, the gate analysis service 202 can work in conjunction with the scheduler to determine a time window for executing the QASM file 212 and can further determine the time window by monitoring the quantum computer system 222.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
receiving, by a gate analysis service, a quantum assembly language (QASM) file, the QASM file defining a quantum algorithm including a set of logic gates that are executable on a quantum computer system;
accessing, by the gate analysis service, a data repository comprising an estimated amount of quantum decoherence associated with each logic gate of a plurality of logic gates that includes the set of logic gates;
determining, by the gate analysis service, a prediction of an amount of quantum decoherence associated with executing at least one logic gate of the set of logic gates on the quantum computer system based on the estimated amount of quantum decoherence associated with each logic gate of the plurality of logic gates; and
adjusting, by the gate analysis service, the QASM file to decrease the prediction associated with executing the set of logic gates on the quantum computer system.

2. The method of claim 1, further comprising:
subsequent to adjusting the QASM file, sending the QASM file to the quantum computer system for execution on the quantum computer system.

3. The method of claim 1, wherein the quantum computer system is a first quantum computer system and the prediction is a first prediction of a first amount of quantum decoherence, and the method further comprises:
determining, by the gate analysis service, a second prediction of a second amount of quantum decoherence for a second quantum computer system; and
determining, by the gate analysis service, the quantum algorithm is to be executed on the second quantum computer system based on the second prediction being less than the first prediction.

4. The method of claim 1, wherein the set of logic gates is a first set of logic gates, and the method further comprises:
performing, by the gate analysis service, a simulation of executing a second set of logic gates on the quantum computer system, wherein the plurality of logic gates exclude the second set of logic gates;
determining, based on the simulation, a second prediction of a second amount of quantum decoherence associated with executing the second set of logic gates on the quantum computer system; and storing, by the gate analysis service, the second amount of quantum decoherence in the data repository.

5. The method of claim 1, further comprising:
determining, by the gate analysis service, a quantum decoherence threshold for the at least one logic gate of the set of logic gates;
determining, by the gate analysis service, that the prediction of the amount of quantum decoherence associated with the at least one logic gate of the set of logic gates exceeds the quantum decoherence threshold;
adjusting, by the gate analysis service, the QASM file by altering the at least one logic gate based on the prediction exceeding the quantum decoherence threshold.

6. The method of claim 5, wherein adjusting the QASM file by altering the at least one logic gate comprises:
replacing, by the gate analysis service, the at least one logic gate of the set of logic gates for which the prediction exceeds the quantum decoherence threshold with at least one logic gate of the plurality of logic gates for which the estimated amount of quantum decoherence does not exceed the quantum decoherence threshold.

7. The method of claim 1, wherein the set of logic gates are defined in a first order associated with the prediction of the amount of quantum decoherence and adjusting the QASM file comprises:
reordering, by the gate analysis service, the at least one logic gate of the set of logic gates and at least one additional logic gate of the set of logic gates into a second order based on the prediction of the amount of quantum decoherence and a second prediction of the amount of quantum decoherence for the at least one additional logic gate.

8. A system comprising:
a processing device; and
a memory device that includes instructions executable by the processing device for causing the processing device to:
receive, by a gate analysis service, a quantum assembly language (QASM) file, the QASM file defining a quantum algorithm including a set of logic gates that are executable on a quantum computer system;
access, by the gate analysis service, a data repository comprising an estimated amount of quantum decoherence associated with each logic gate of a plurality of logic gates that includes the set of logic gates;
determine, by the gate analysis service, a prediction of an amount of quantum decoherence associated with executing at least one logic gate of the set of logic gates on the quantum computer system based on the estimated amount of quantum decoherence associated with each logic gate of the plurality of logic gates; and
adjust, by the gate analysis service, the QASM file to decrease the prediction associated with executing the set of logic gates on the quantum computer system.

9. The system of claim 8, wherein the memory device further includes instructions executable by the processing device for causing the processing device to:
send, subsequent to adjusting the QASM file, the QASM file to the quantum computer system for execution on the quantum computer system.

10. The system of claim 8, wherein the quantum computer system is a first quantum computer system and the prediction is a first prediction of a first amount of quantum decoherence, and the memory device further includes instructions executable by the processing device for causing the processing device to:

determine, by the gate analysis service, a second prediction of a second amount of quantum decoherence for a second quantum computer system; and determine, by the gate analysis service, the quantum algorithm is to be executed on the second quantum computer system based on the second prediction being less than the first prediction.

11. The system of claim 8, wherein the set of logic gates is a first set of logic gates, and the memory device further includes instructions executable by the processing device for causing the processing device to:

perform, by the gate analysis service, a simulation of executing a second set of logic gates on the quantum computer system, wherein the plurality of logic gates exclude the second set of logic gates;

determine, based on the simulation, a second prediction of a second amount of quantum decoherence associated with executing the second set of logic gates on the quantum computer system; and store, by the gate analysis service, the second amount of quantum decoherence in the data repository.

12. The system of claim 8, wherein the memory device further includes instructions executable by the processing device for causing the processing device to:

determine, by the gate analysis service, a quantum decoherence threshold for the at least one logic gate of the set of logic gates;

determine, by the gate analysis service, that the prediction of the amount of quantum decoherence associated with the at least one logic gate of the set of logic gates exceeds the quantum decoherence threshold; and adjust, by the gate analysis service, the QASM file by altering the at least one logic gate based on the prediction exceeding the quantum decoherence threshold.

13. The system of claim 12, wherein the memory device further includes instructions executable by the processing device for causing the processing device to adjust the QASM file by altering the at least one logic gate, wherein altering the at least one logic gate comprises:

replacing, by the gate analysis service, the at least one logic gate of the set of logic gates for which the prediction exceeds the quantum decoherence threshold with at least one logic gate of the plurality of logic gates for which the estimated amount of quantum decoherence does not exceed the quantum decoherence threshold.

14. The system of claim 8, wherein the set of logic gates are defined in a first order associated with the prediction of the amount of quantum decoherence, and wherein the memory device further includes instructions executable by the processing device for causing the processing device to adjust the QASM file by:

reordering, by the gate analysis service, the at least one logic gate of the set of logic gates and at least one additional logic gate of the set of logic gates into a second order based on the prediction of the amount of quantum decoherence and a second prediction of the amount of quantum decoherence for the at least one additional logic gate.

15. A non-transitory computer-readable medium comprising program code that is executable by a processing device for causing the processing device to:

receive, by a gate analysis service, a quantum assembly language (QASM) file, the QASM file defining a quantum algorithm including a set of logic gates that are executable on a quantum computer system;

access, by the gate analysis service, a data repository comprising an estimated amount of quantum decoherence associated with each logic gate of a plurality of logic gates that includes the set of logic gates;

determine, by the gate analysis service, a prediction of an amount of quantum decoherence associated with executing at least one logic gate of the set of logic gates on the quantum computer system based on the estimated amount of quantum decoherence associated with each logic gate of the plurality of logic gates; and adjust, by the gate analysis service, the QASM file to decrease the prediction associated with executing the set of logic gates on the quantum computer system.

16. The non-transitory computer-readable medium of claim 15, further comprising program code that is executable by the processing device for causing the processing device to:

send, subsequent to adjusting the QASM file, the QASM file to the quantum computer system for execution on the quantum computer system.

17. The non-transitory computer-readable medium of claim 15, wherein the quantum computer system is a first quantum computer system and the prediction is a first prediction of a first amount of quantum decoherence, and further comprising program code that is executable by the processing device for causing the processing device to:

determine, by the gate analysis service, a second prediction of a second amount of quantum decoherence for a second quantum computer system; and determine, by the gate analysis service, the quantum algorithm is to be executed on the second quantum computer system based on the second prediction being less than the first prediction.

18. The non-transitory computer-readable medium of claim 15, wherein the set of logic gates is a first set of logic gates, and further comprising program code that is executable by the processing device for causing the processing device to:

perform, by the gate analysis service, a simulation of the execution of a second set of logic gates on the quantum computer system, wherein the plurality of logic gates exclude the second set of logic gates;

determine, based on the simulation, a second prediction of a second amount of quantum decoherence associated with executing the second set of logic gates on the quantum computer system; and store, by the gate analysis service, the second amount of quantum decoherence in the data repository.

19. The non-transitory computer-readable medium of claim 15, further comprising program code that is executable by the processing device for causing the processing device to:

determine, by the gate analysis service, a quantum decoherence threshold for the at least one logic gate of the set of logic gates;

determine, by the gate analysis service, that the prediction of the amount of quantum decoherence associated with the at least one logic gate of the set of logic gates exceeds the quantum decoherence threshold; and adjust, by the gate analysis service, the QASM file by altering the at least one logic gate based on the prediction exceeding the quantum decoherence threshold.

20. The non-transitory computer-readable medium of claim 19, further comprising program code that is executable by the processing device for causing the processing device to adjust the QASM file by altering the at least one logic gate by:

replacing, by the gate analysis service, the at least one logic gate of the set of logic gates for which the prediction exceeds the quantum decoherence threshold with at least one logic gate of the plurality of logic gates for which the estimated amount of quantum decoherence does not exceed the quantum decoherence threshold.

* * * * *